United States Patent
Brey et al.

[11] 3,850,731
[45] Nov. 26, 1974

[54] TIRE DISCHARGE MECHANISM

[75] Inventors: Wilhelm Brey, Cuyahoga Falls, Ohio; William Hostetler, Santa Ana, Calif.; Earl Ferdnand Loeffler, Akron, Ohio; Hubert Ernest Kolm, Louisville, Ohio; Fred Grove Elder, Atwater, Ohio

[73] Assignee: The Firestone Tire & Rubber Company, Akron, Ohio

[22] Filed: Sept. 15, 1971

[21] Appl. No.: 180,921

Related U.S. Application Data
[62] Division of Ser. No. 10,579, Feb. 11, 1970, Pat. No. 3,700,526.

[52] U.S. Cl. ............... 156/414, 156/111, 156/417
[51] Int. Cl. ........................................... B29h 17/16
[58] Field of Search .......... 156/111, 414, 415, 416, 156/417, 128, 130, 133

[56] References Cited
UNITED STATES PATENTS

| | | | |
|---|---|---|---|
| 2,313,035 | 3/1943 | Breth | 156/130 |
| 3,240,653 | 3/1966 | Mattox et al. | 156/128 |
| 3,645,818 | 2/1972 | Frazier | 156/128 |
| 3,687,756 | 8/1972 | Appleby et al. | 156/396 |
| 3,738,893 | 6/1973 | Edler | 156/128 |

*Primary Examiner*—Clifton B. Cosby

[57] ABSTRACT

A fully automatic machine for producing "green tires" or unvulcanized tire carcasses, especially suitable for making tubeless tires. The machine comprises a plurality of interconnected and dependent assemblies or stations where specialized operations, normally done semi-automatically or by hand, are carried out by mechanical devices acting in sequence. The machine includes a plurality of conventional tire building drums continuously moving between horizontally disposed, stationary table assemblies where innerliner and chafer strips, and first and second ply material are successively wrapped on the drums as they move across the table on which the material is positioned. The wrapped drums from these assemblies, are sent to turrent units where they are arcuately positioned for receiving beads, tread cushion, stitching, strips of whitewall, if required, and are discharged from the collapsed drums for removal and storage. The stripped drums, or drums from which tires are removed, are automatically expanded and recycled through the assemblies for building more tire carcasses.

3 Claims, 5 Drawing Figures

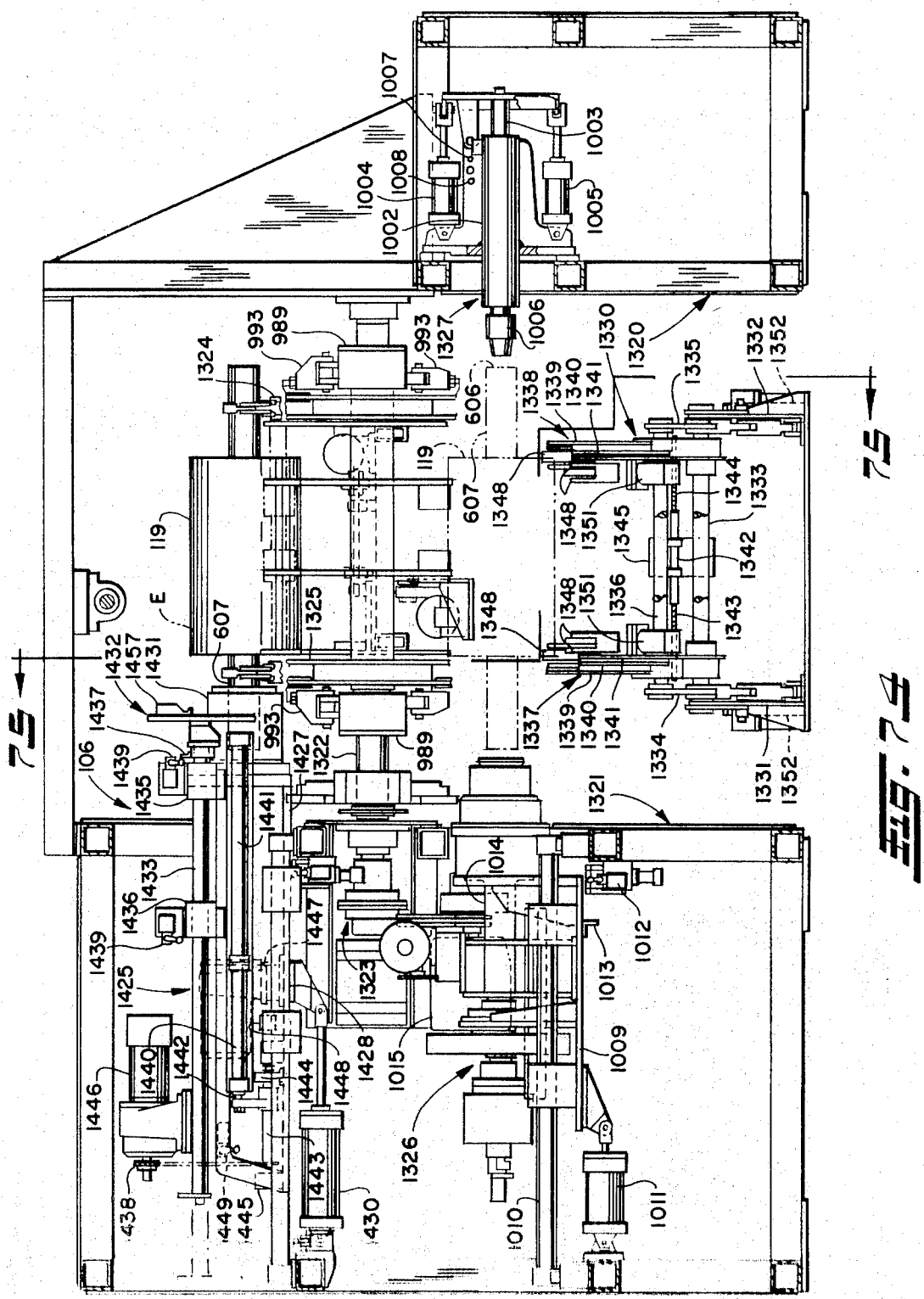

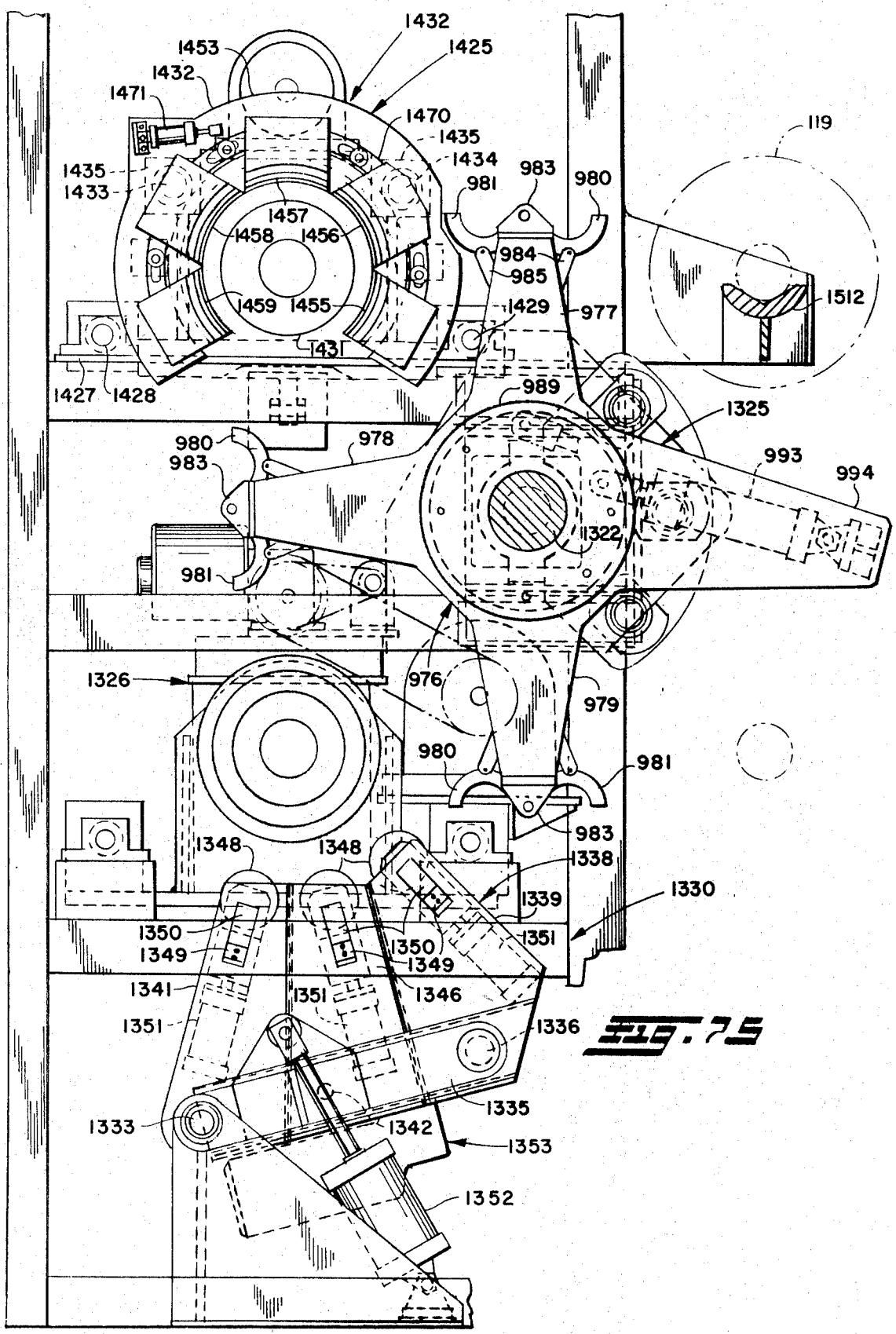

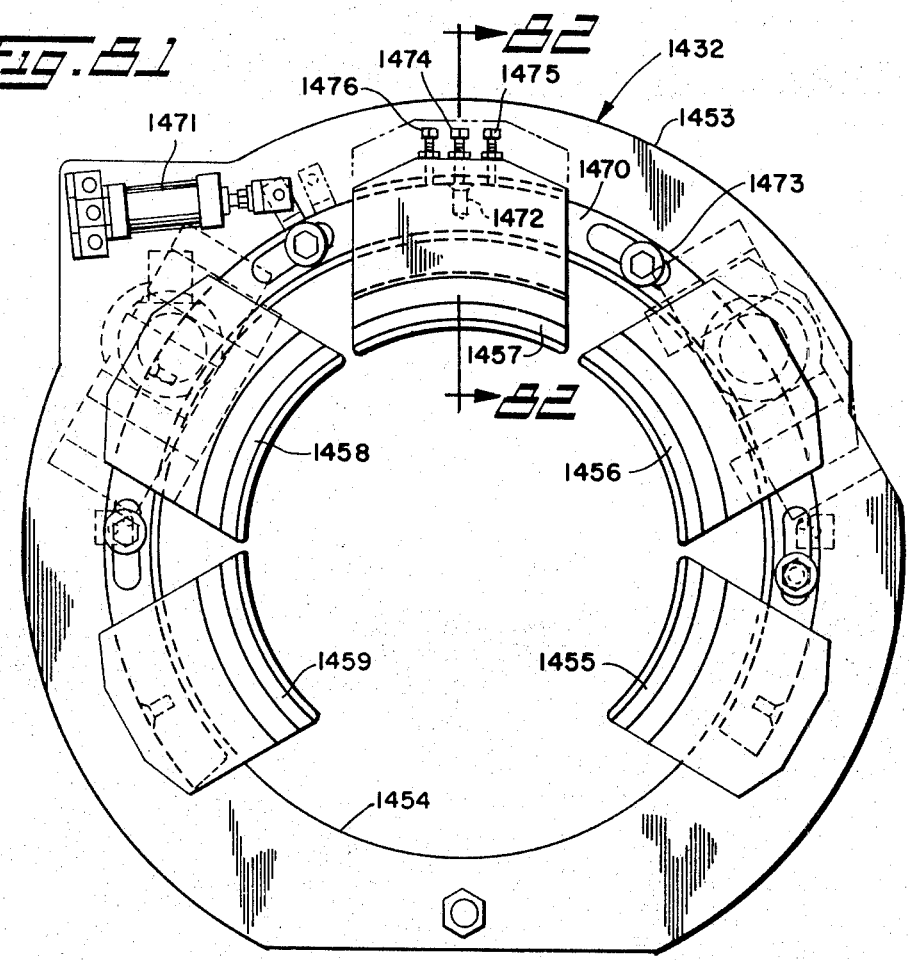

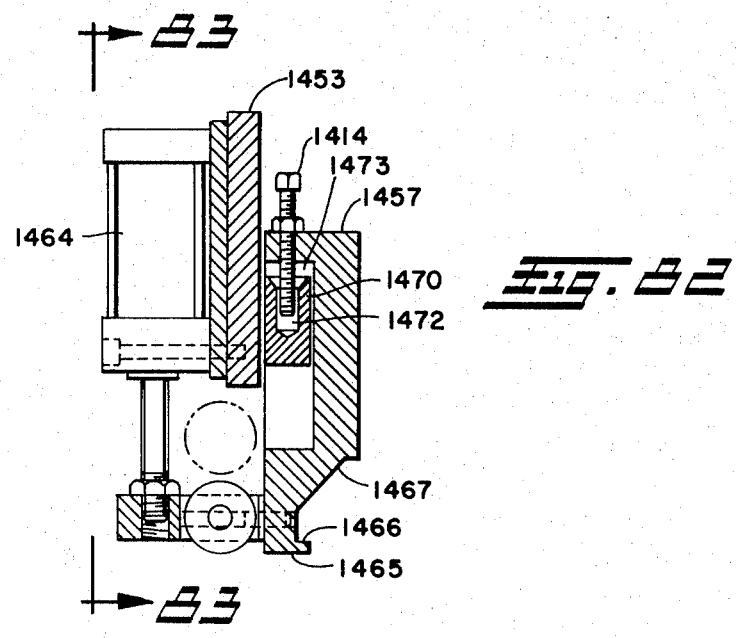

3,850,731

TIRE DISCHARGE MECHANISM

This is a division of application Ser. No. 10,579, filed Feb. 11, 1970, now U.S. Pat. No. 3,700,526, the disclosure of which is hereby incorporated herein by reference, and which may be consulted for relation between the several inventive concepts of the continuing divided inventions.

DESCRIPTION OF THE FIGURES OF THE DRAWING

The following description of the invention will be better understood by referring to the annexed drawing, wherein:

FIGS. 1–73, 76–80, and 84–97 appear in U.S. Pat. No. 3,700,526 and are incorporated herein by reference.

FIG. 74 is a side view of a second turret assembly for stitching beads, applying white sidewall, and discharging the tire carcass from a tire building drum;

FIG. 75 is a section viewed from the line 75—75 of FIG. 74;

FIG. 81 is a front view of a discharge ring for engaging the tire carcass;

FIG. 82 is a section viewed from the line 82—82 of FIG. 81;

DESCRIPTION OF THE INVENTION

Tire Discharge Mechanism

Figure 83:
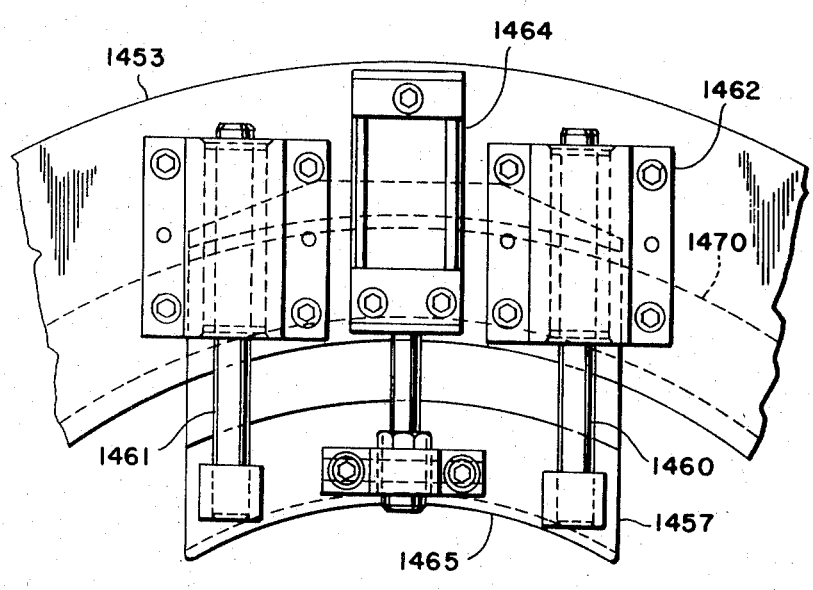
FIG. 83 is a portion of the discharge ring viewed from the line 83—83 of FIG. 82.

A discharge assembly, generally indicated at 1425 (FIGS. 74–75) is provided on the turret frame 1321 for supporting the building drum 119 and removing the green tire carcass. The end of the building drum 119 adjacent the turret frame 1320 is unsupported to permit removal of the tire carcass on to a discharge conveyor 1426 (FIGS. 85–89).

The discharge assembly 1425 comprises a base plate 1427, which is slidably mounted on a pair of guide rails 1428 and 1429 secured in parallel relation to the turret frame 1321. An air cylinder 1430 is coupled to the base plate 1427 for moving the discharge assembly 1425 towards the building drum 119.

A conventionally designed collet chuck and operating assembly 1431 is mounted on the base plate 1427 for engaging and supporting the adjacent drum shaft 607.

A discharge ring 1432, for engaging a tire carcass and pushing it from the building drum 119, is secured to a pair of guide rods 1433 and 1434 which are each slidably mounted on a set of aligned bushings 1435 and 1436 carried by the base plate 1427. A number of projecting lugs 1437 and 1438 are carried by the discharge ring 1432 for engaging a set of limit switches 1439 mounted on the guide bushings 1435 and 1436, to sense the travel or movement of the discharge ring 1432 relative to the building drum 119.

A couple of air cylinders 1440 and 1441 in back-to-back relation, are provided for moving the discharge ring 1432. The rear cylinder 1440 acts to move the discharge ring 1432 into engagement with the adjacent bead of the tire carcass, and the front cylinder 1441 acts to move the discharge ring 1432 axially across the building drum 119 to push the tire carcass from the building drum 119.

The stroke of the rear cylinder 1440 is adjustable to accommodate different building drum sizes. The piston rod 1442 protruding from the rear cylinder 1440, is coupled to a drive screw 1443 which is journalled for rotation between a pair of spaced pillow blocks 1444 and 1445 secured to the base plate 1427. An electric motor 1446 is provided for rotating the drive screw 1443 to move the piston rod 1442 relative to the rear cylinder 1440. A mechanism, e.g. potentiometer 1447 and reducer 1448, is coupled to the drive screw 1443 for sensing the position of the protruding piston rod 1442 relative to the rear cylinder 1440. A limit switch 1449 is positioned for sensing the maximum travel of the piston rod 1442 from the rear cylinder 1440.

The discharge ring 1432 (FIGS. 81–83) comprises a support plate 1453 with a circular opening 1454 through which any size building drum will pass with sufficient clearance. A set of ring segments 1455–1459 are carried by the support plate 1453 for engaging the adjacent bead of the tire carcass and supporting it in generally circular relation, as the tire carcass is removed from the building drum. The ring segments 1455–1459 are equally spaced radially from the center point of the circular opening 1454 of the support plate 1453. The ring segments 1455–1459 are arcuately spaced around the upper portion of the support plate 1453. The ring segments 1455–1459 are adjustable radially from the center point of the support opening 1454 to accommodate 13, 14, and 15 inch bead diameters. Since all of the ring segments are identical and are operated in the same manner, their description will be given in relation to ring segment 1457.

The ring segment 1457 (FIGS. 82–83) is fastened on a pair of parallel guide pins 1460 and 1461 which are slidably mounted in a couple of bushings 1462 and 1463 secured in parallel relation on the support plate 1453. An air cylinder 1464 intermediate the bushings 1462 and 1463 is coupled to this ring segment 1457 for moving it radially towards the center point of the support opening 1454. The ring segment 1457, along its inner arcuate edge 1465, is provided with a projecting shoulder 1466 for supporting engagement with a tire bead. A wedging surface 1467 slopes or converges toward the shoulder 1466 for engaging a misaligned bead and deflecting it into seating relation against the shoulder 1466.

The ring segments 1455–1459 straddle an arcuate collar 1470 which is slidably mounted on the support plate 1453 for limited rotation about the center point of the support opening 1454. An air cylinder 1471 is connected to the arcuate collar 1470 for rotating it. A number of similar holes 1472 are arcuately spaced along the outer periphery 1473 of the collar 1470 in aligned relation with an adjustable center bolt 1474 carried by each of the ring segments 1455–1459. Further, the ring segments 1455–1459, each carry a set of adjustable side bolts 1475 and 1476 which are positioned on either side of the center bolt 1474 for engaging the periphery 1473 of the collar 1470, when the center bolt 1474 is positioned in the hole 1472. The ring segments 1455–1459 are in position for engaging a 15 inch bead when they are fully retracted relative to the operating air cylinders 1464. The ring segments 1455–1459 are in position to engage a 14 inch bead when the center bolt 1474 engages the periphery 1473 of the collar 1470. The ring segments 1455–1459 are in position for engaging a 13 inch bead when the center bolt 1474 is in the hole 1472 and the side bolts 1475 and 1476 engage the periphery 1473 of the collar 1470.

The ring segments 1455–1459 are adjusted in all cases first, by fully retracting them adjacent their operating cylinders. If a 13 or 14 inch bead ring size is desired, the collar 1470 is rotated accordingly to align or disalign the holes 1472 with the center bolts 1474.

The ring segments 1455–1459 are moved into supporting engagement with the adjacent bead, prior to collapsing the building drum 119. The ring segments 1455–1459 hold the bead, and to some extent the tire carcass, in circular surrounding relation with the collapsed drum 119, as the carcass is pushed on to the discharge conveyor 1426. The opposing end of the tire carcass is supported by the discharge conveyor 1426 which is moved under the building drum 119 to receive the discharged tire carcass.

What is claimed is:

1. A mechanism for discharging a green tire carcass from its building drum supported on a building machine, comprising
    1. a substantially annular plate,
    2. means to move said plate axially over and parallel to the building drum,
    3. ring segments arcuately spaced about said plate,
    4. means to adjust said segments radially on said plate, and
    5. shoulders on said segments to support the tire carcass by its bead when the building drum is collapsed.

2. A mechanism as in claim 1, and
    6. means for locating the ring segments at preselected diameters.

3. A mechanism as in claim 2, wherein said locating means comprises an annular collar rotatable on said plate.

* * * * *